(12) United States Patent
Cheng

(10) Patent No.: US 10,876,719 B2
(45) Date of Patent: Dec. 29, 2020

(54) CEILING-MOUNTED DEVICE SUPPORT, CEILING-MOUNTED DEVICE, AND METHOD FOR REMOVING CEILING-MOUNTED DEVICE

(71) Applicant: popIn Inc., Tokyo (JP)

(72) Inventor: Tao Cheng, Tokyo (JP)

(73) Assignee: popIn Inc.

( * ) Notice: Subject to any disclaimer, the term of this patent is extended or adjusted under 35 U.S.C. 154(b) by 57 days.

(21) Appl. No.: 16/514,486

(22) Filed: Jul. 17, 2019

(65) Prior Publication Data

US 2019/0376671 A1 Dec. 12, 2019

Related U.S. Application Data

(63) Continuation of application No. PCT/JP2018/022469, filed on Jun. 12, 2018.

(51) Int. Cl.
*F21V 21/03* (2006.01)
*F21V 17/18* (2006.01)
*F21S 8/04* (2006.01)
*B65G 9/00* (2006.01)
(Continued)

(52) U.S. Cl.
CPC .............. *F21V 21/03* (2013.01); *B65G 7/12* (2013.01); *B65G 9/00* (2013.01); *F21S 8/043* (2013.01); *F21V 17/18* (2013.01); *F21V 21/40* (2013.01)

(58) Field of Classification Search
CPC ........ F21V 21/03; F21V 21/40; F21V 21/403; F21V 21/406; F21V 17/104; F21V 17/18; F21S 8/04; F21S 8/043; F21S 8/046; B65G 7/12; A45F 5/10

USPC ......... 81/436, 439, 442, 443, 448, 451, 486; 294/158
See application file for complete search history.

(56) References Cited

U.S. PATENT DOCUMENTS 1,227,391 A * 5/1917 Cooper ................... B25B 13/54
  81/442
2,719,747 A * 10/1955 Layne ....................... B66C 1/54
  294/89
(Continued)

FOREIGN PATENT DOCUMENTS

JP   H0696612 A   4/1994
JP   H1125741 A   1/1999
(Continued)

OTHER PUBLICATIONS

Patent Translate Powered by EPO and Google, Description JP2001057107A, Apr. 11, 2020, pp. 1-17.*
(Continued)

*Primary Examiner* — Alan B Cariaso
(74) *Attorney, Agent, or Firm* — St Onge Steward Johnston & Reens LLC

(57) ABSTRACT

A ceiling-mounted device support includes an engagement portion to be engaged with an attachment portion of a ceiling-mounted device mounted on a ceiling surface of a room with an adapter, and includes a side wall having an open upper end, an open lower end, and an internal space, and a support portion having two ends connected to the side wall and extending through the space. The engagement portion is to be engaged with the attachment portion, and the support portion is supportable with a palm and grippable with digits of a hand.

20 Claims, 7 Drawing Sheets

(51) Int. Cl.
*F21V 21/40* (2006.01)
*B65G 7/12* (2006.01)

(56) References Cited

U.S. PATENT DOCUMENTS

| | | | | |
|---|---|---|---|---|
| 3,159,234 | A * | 12/1964 | Junk | H04R 1/025 |
| | | | | 181/155 |
| 4,878,156 | A * | 10/1989 | Hallings | F21V 21/403 |
| | | | | 362/109 |
| 5,742,895 | A * | 4/1998 | Tanigawa | H01R 13/625 |
| | | | | 342/51 |
| 2007/0177390 | A1 * | 8/2007 | Evans | F21S 8/06 |
| | | | | 362/365 |
| 2011/0108784 | A1 * | 5/2011 | Bogh-Sorensen | A61G 7/1073 |
| | | | | 254/133 R |
| 2011/0133503 | A1 * | 6/2011 | Amato | B65G 7/12 |
| | | | | 294/158 |
| 2014/0097315 | A1 * | 4/2014 | Korcz | H02G 3/20 |
| | | | | 248/324 |
| 2015/0369456 | A1 * | 12/2015 | Creusen | F21V 17/12 |
| | | | | 362/257 |
| 2018/0051463 | A1 * | 2/2018 | Little | F16M 13/027 |
| 2018/0063611 | A1 * | 3/2018 | Hart | H04R 1/025 |

FOREIGN PATENT DOCUMENTS

| | | |
|---|---|---|
| JP | 2001057107 A | 2/2001 |
| JP | 2001076531 A | 3/2001 |
| JP | 2015216099 A | 12/2015 |
| JP | 2016066496 A | 4/2016 |
| JP | 2017126573 A | 7/2017 |
| TW | M548240 U | 9/2017 |

OTHER PUBLICATIONS

Patent Translate Powered by EPO and Google, Description JP2015216099A, Apr. 11, 2020, pp. 1-32.*
Patent Translate Powered by EPO and Google, Description JPH1125741A, Apr. 11, 2020, pp. 1-13.*
Taiwanese Intellectual Property Office, TW Office Action dated Oct. 30, 2019 & English translation, Application No. 108118336 (5 pages).
The Korean Intellectual Property Office, KR Office Action dated Mar. 16, 2020 & English translation, Application No. 10-2019-7012990 (12 pages).
Taiwanese Intellectual Property Office, TW Office Action dated Oct. 31, 2019 & English translation, Application No. 10821032300 (5 pages).

* cited by examiner

CEILING-MOUNTED DEVICE SUPPORT, CEILING-MOUNTED DEVICE, AND METHOD FOR REMOVING CEILING-MOUNTED DEVICE

FIELD OF THE INVENTION

The present disclosure relates to a ceiling-mounted device support that is used to remove a fixture such as a lighting fixture mounted on the ceiling surface of a room from an adapter attached to a ceiling rose body, a ceiling-mounted device for which the ceiling-mounted device support can be used, and a method for removing the ceiling-mounted device.

BACKGROUND OF THE INVENTION

A fixture such as a lighting fixture mounted on the ceiling surface of a room is usually attached with an adapter to a ceiling rose body mounted on the ceiling. However, a heavy lighting fixture (e.g., a chandelier or a projector-integrated light) is difficult to mount on a ceiling.

To address this issue, Japanese Patent Application Kokai Publication No. 2001-76531 describes a lightweight lighting fixture including a resin molded piece as a lighting fixture body.

The lighting fixture described in Japanese Patent Application Kokai Publication No. 2001-76531 including a lightweight resin fixture body 1 is easily attached to a ceiling rose 31 mounted on a ceiling with an attachment adapter 10. To remove the lighting fixture, however, a user operates operation buttons 10d on the attachment adapter 10 with one hand while supporting the lighting fixture with only the other hand. The user bears the entire weight of the lighting fixture removed from the attachment adapter 10 with only one hand, and can drop the lighting fixture during the removal.

SUMMARY OF THE INVENTION

One or more aspects of the present disclosure are directed to a ceiling-mounted device support that allows easy and safe removal of a fixture such as a lighting fixture with any weight from an adapter, a ceiling-mounted device for which the ceiling-mounted device support can be used, and a method for removing the ceiling-mounted device.

A ceiling-mounted device support according to a first aspect of the present disclosure includes an engagement portion to be engaged with an attachment portion of a ceiling-mounted device mounted on a ceiling surface of a room with an adapter, and including a side wall having an open upper end and an open lower end, and an internal space, and a support portion having two ends connected to the side wall and extending through the space. The engagement portion is to be engaged with the attachment portion, and the support portion is supportable with a palm and grippable with digits of a hand.

The side wall may be wider at the lower end than at the upper end in a side view.

The side wall may be fitted to the attachment portion.

The attachment portion and the side wall may have a substantially circular cross section in a plan view.

The engagement portion may further include a press-fixed portion at the upper end, and the press-fixed portion may be press-fixed and thus engaged with the attachment portion.

The support portion may be removable.

A ceiling-mounted device according to a second aspect of the present disclosure is mountable on a ceiling surface of a room with an adapter, and includes an attachment portion to accommodate at least part of the adapter or to be located around a lower portion of the adapter. The attachment portion is to receive a ceiling-mounted device support including an engagement portion to be engaged with the attachment portion and a support portion, the engagement portion includes a side wall having an open upper end, an open lower end, and an internal space, and the support portion has two ends connected to the side wall and extends through the space, and the support portion is supportable with a palm and grippable with digits of a hand.

The attachment portion may be arranged in substantially a center in a plan view.

The attachment portion may include a wall surface protruding downward.

A method for removing a ceiling-mounted device according to a third aspect of the present disclosure includes engaging an engagement portion of a ceiling-mounted device support with an attachment portion of a ceiling-mounted device mounted on a ceiling surface of a room with an adapter, the ceiling-mounted device support including a side wall having an open upper end, an open lower end, and an internal space, and removing the ceiling-mounted device from the adapter, performed by a user, while supporting a portion of the ceiling-mounted device other than the attachment portion with one hand, placing another hand through the lower end, and placing digits of the another hand through the upper end while supporting, with the another hand, a support portion having two ends connected to the side wall and extending through the space.

The aspects of the present disclosure allow easy and safe removal of a fixture such as a lighting fixture with any weight from an adapter.

DETAILED DESCRIPTION OF THE INVENTION

Figure 1:
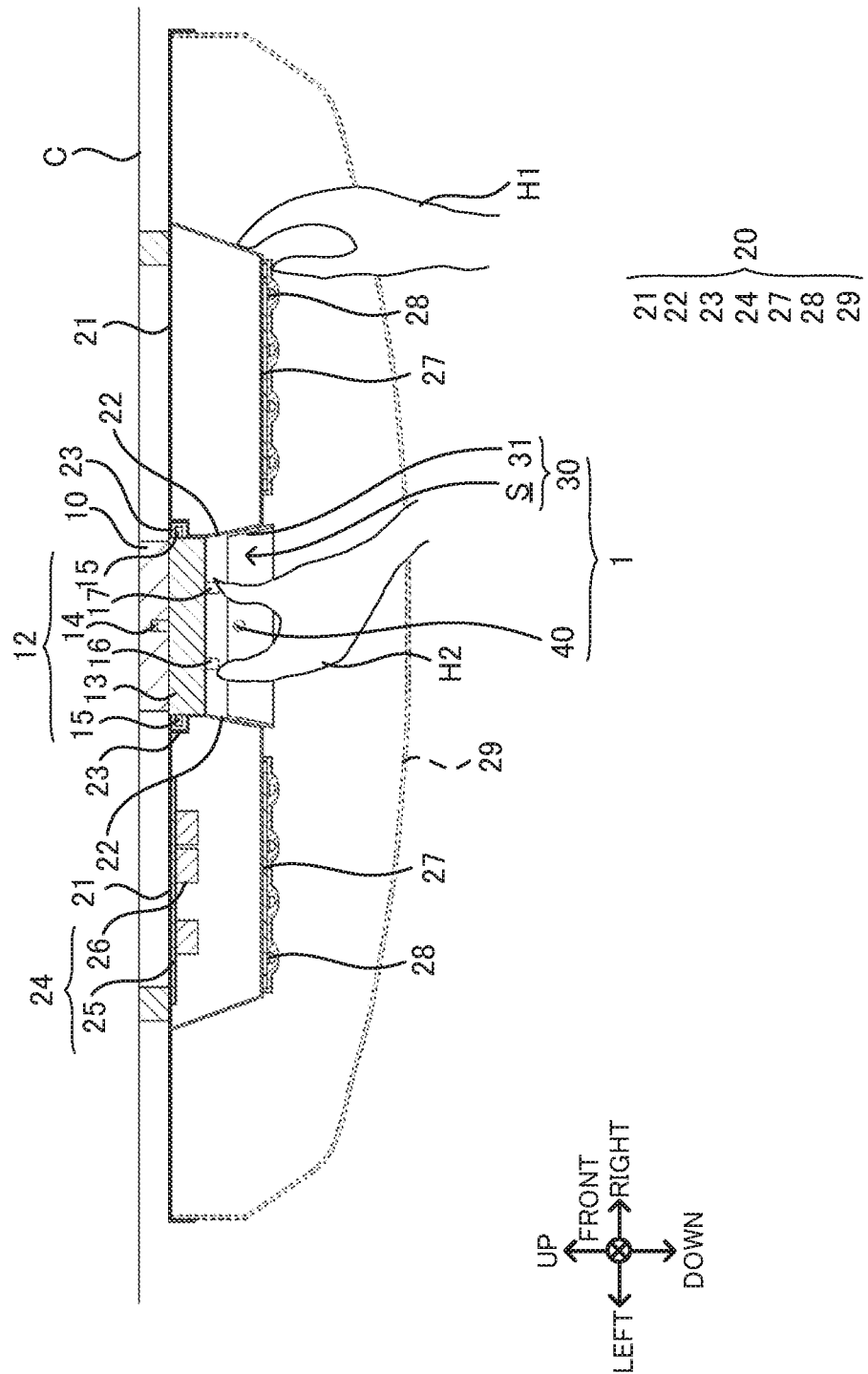
FIG. 1 is a cross-sectional side view of a ceiling-mounted device without a cover during removal from an adapter using a ceiling-mounted device support according to an embodiment of the present disclosure.

A ceiling-mounted device support, a ceiling-mounted device for which the ceiling-mounted device support can be used, and a method for removing the ceiling-mounted device according to one or more embodiments of the present disclosure will now be described with reference to the drawings. Up, down, right, left, front, and rear referred to herein are defined as indicated by the arrows in the drawings. The same or similar portions are denoted by the same reference signs.

As shown in FIG. 1, a ceiling-mounted device support 1 according to one embodiment of the present disclosure is used to remove, from an adapter 12, a ceiling-mounted device 20 connected with the adapter 12 to a lighting wiring base 10, which is a substantially cylindrical ceiling rose body mounted on a ceiling surface C of a room.

The lighting wiring base 10 is a power supply socket that supports the ceiling-mounted device 20 and feeds power to the ceiling-mounted device 20.

Structure of Ceiling-Mounted Device Support 1

Figure 2:
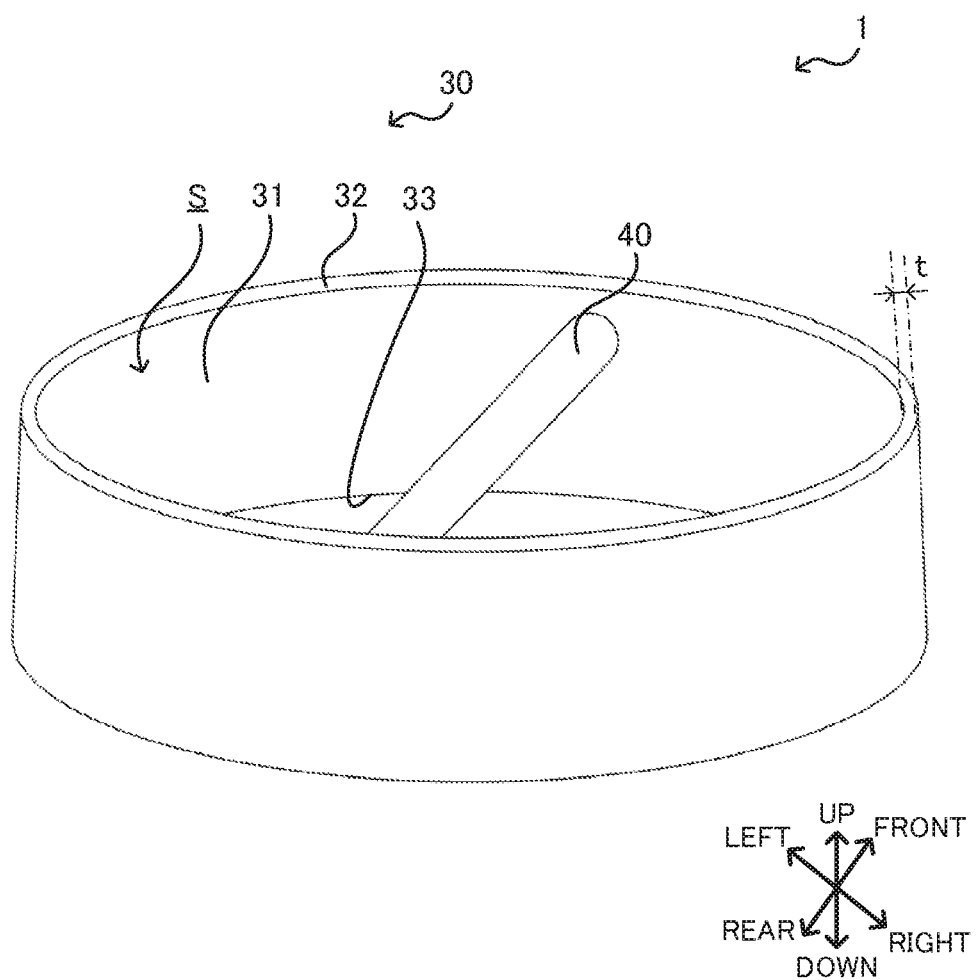
FIG. 2 is a perspective view of the ceiling-mounted device support according to the embodiment of the present disclosure.

As shown in FIG. 2, the ceiling-mounted device support 1 includes an engagement portion 30 and a support portion 40.

The engagement portion 30 includes a side wall 31 having an open upper end 32 and an open lower end 33. The engagement portion 30 is formed from an elastic material, such as rubber, and is fitted into an attachment portion 22 of the ceiling-mounted device 20 described later. In a plan view, the side wall 31 is substantially circular and has a uniform thickness t. In a side view, the side wall 31 is a substantially trapezoidal strip-shaped member with the lower end 33 wider (having a larger diameter) than the upper end 32.

The side wall 31 has an internal space S. To remove the ceiling-mounted device 20 from the adapter 12, as shown in FIG. 1, a user supporting the ceiling-mounted device 20 with one hand H1 places another hand H2 into the space S and operates levers 16 and 17 (described later) on the adapter 12 with digits of the another hand H2.

As shown in FIG. 2, the support portion 40 is substantially columnar, and has both ends connected to the side wall 31 to extend through the space S in the front-rear direction. In the present embodiment, the support portion 40 is integral with the side wall 31. The support portion 40 is arranged at around the same level as the upper end 32 of the side wall 31 in a side view. The support portion 40 is formed from rubber.

To remove the ceiling-mounted device 20 from the adapter 12, as shown in FIG. 1, the user supporting the ceiling-mounted device 20 with the one hand H1 places the another hand H2 into the space S and operates the adapter 12 with the digits of the another hand H2 while tightly gripping the support portion 40 with the another hand H2 or supporting the support portion 40 with the palm of the another hand H2 from below.

Structure of Ceiling-Mounted Device 20

Figure 3:
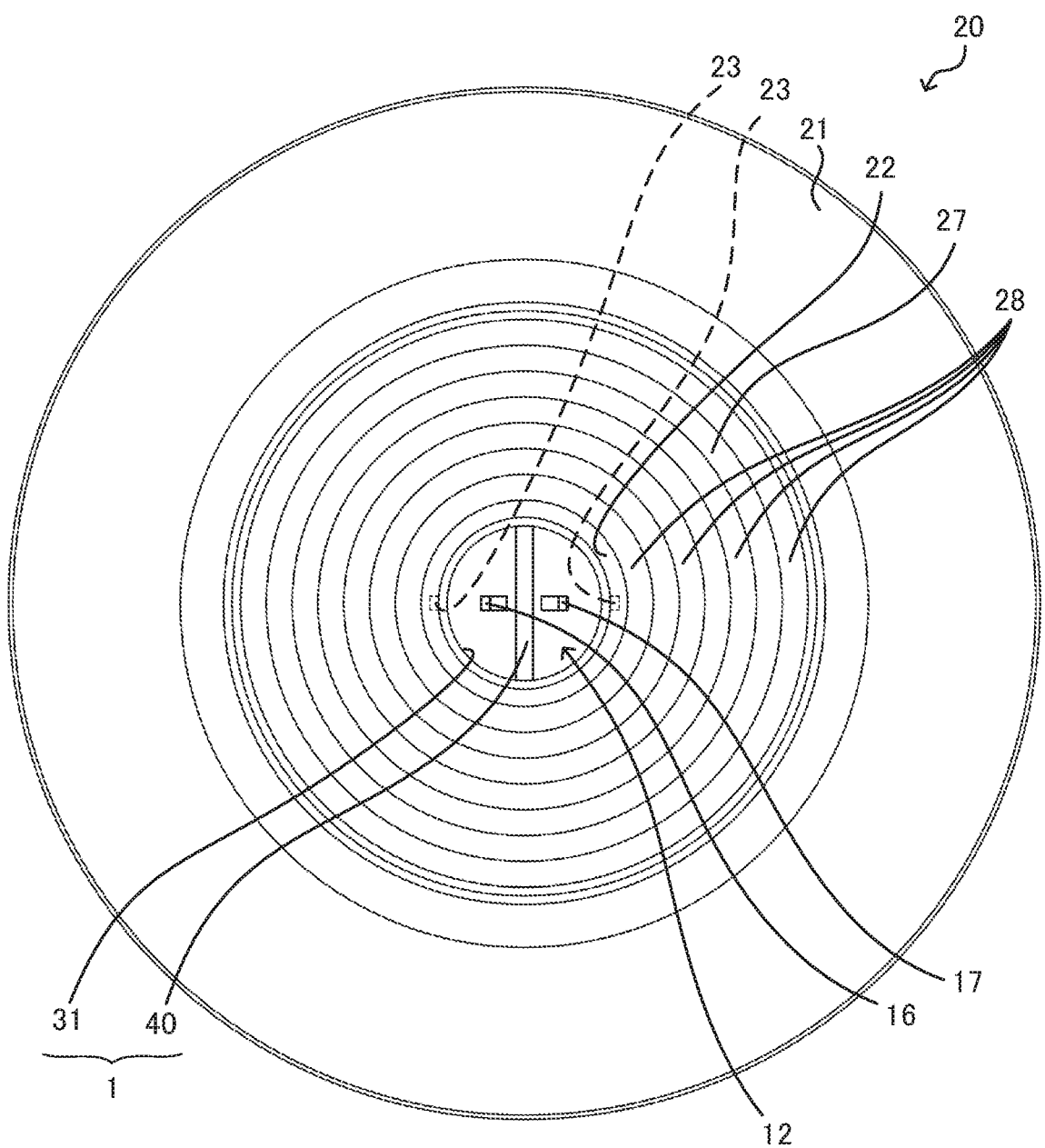
FIG. 3 is a bottom view of the ceiling-mounted device and the adapter according to an embodiment of the present disclosure.
Figure 3:
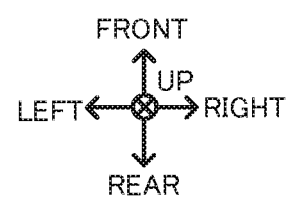

The ceiling-mounted device 20 according to the present embodiment is a hamburger bun-shaped ceiling light that weighs about 5 kg. As shown in FIG. 3, the ceiling-mounted device 20 is substantially circular in a plan view, and is connected to the adapter 12 in the center.

In the present embodiment, the ceiling-mounted device 20 is a ceiling light including light emitting diodes (LEDs) 28 as a light source. As shown in FIG. 1, the ceiling-mounted device 20 includes an upper housing 21, a power circuit 24, a light source board 27, LEDs 28, a cover 29, and a power supply connector (not shown).

The upper housing 21 is formed from a steel plate such as a steel plate cold commercial (SPCC) processed into a substantially ring shape in a plan view, to which a disk having a recessed cross section in a side view is attached. The disk includes the attachment portion 22 along the inner rim of the ring portion.

The attachment portion 22 is a substantially cylindrical wall surface extending in the vertical direction of the upper housing 21. The attachment portion 22 is arranged in substantially the center of the ceiling-mounted device 20 in a bottom view. The attachment portion 22 has locking slots 23 on the right and left, at which the attachment portion 22 is engaged with device locking tabs 15 of the adapter 12 described later. The attachment portion 22 receives the adapter 12. To remove the ceiling-mounted device 20 from the adapter 12, the engagement portion 30 of the ceiling-mounted device support 1 is fitted into the attachment portion 22.

The cover 29, serving as a lower housing, is formed from a resin and is light transmissive. The cover 29 is attached to the upper housing 21 to cover the bottom of the attachment portion 22 and the LEDs 28.

The power circuit 24 includes a power supply board 25 and multiple electronic components 26 mounted on the power supply board 25. The power circuit 24 is attached to the upper housing 21. The power circuit 24 receives alternating-current (AC) power through, for example, the lighting wiring base 10 and the adapter 12, converts the received AC power into predetermined direct-current (DC) power, and feeds the resultant DC power to the LEDs 28 to illuminate the LEDs 28.

As shown in FIG. 3, the light source board 27 has a substantially disk shape in a bottom view, and is attached to the upper housing 21. The LEDs 28 have substantially ring shapes with different diameters in a bottom view, and are mounted on the light source board 27.

Structure of Adapter 12

Figure 4A:
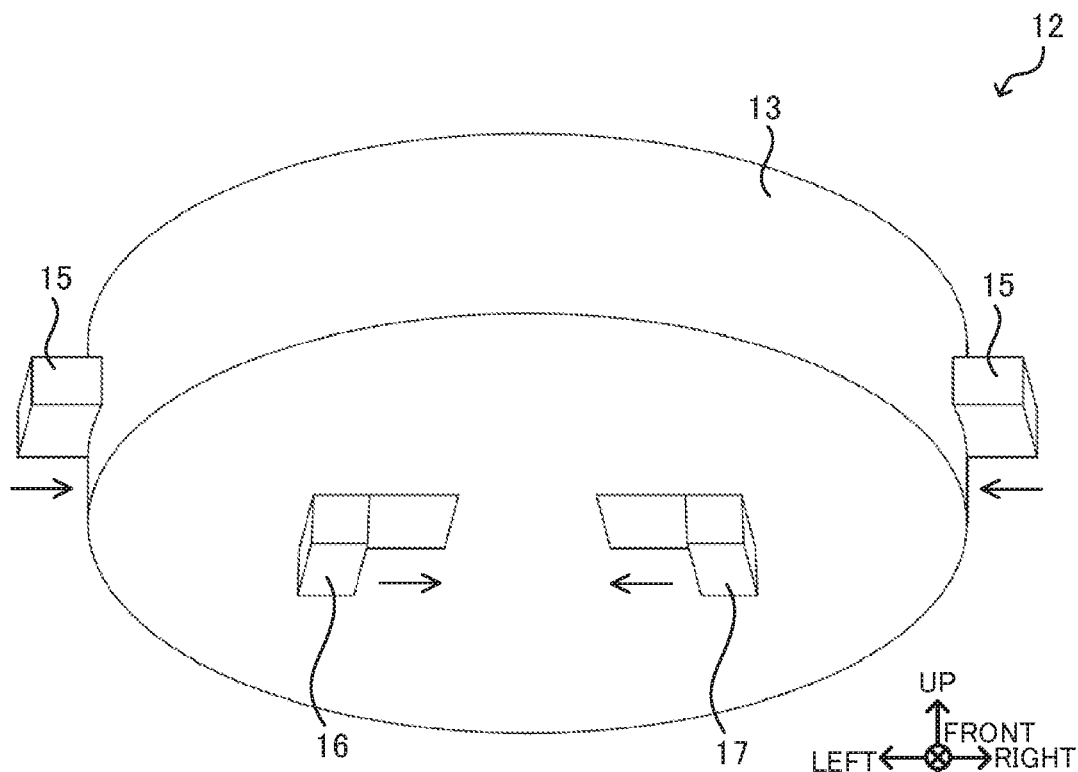
FIG. 4A is a perspective view of the adapter according to the embodiment of the present disclosure as viewed from below.
Figure 4B:
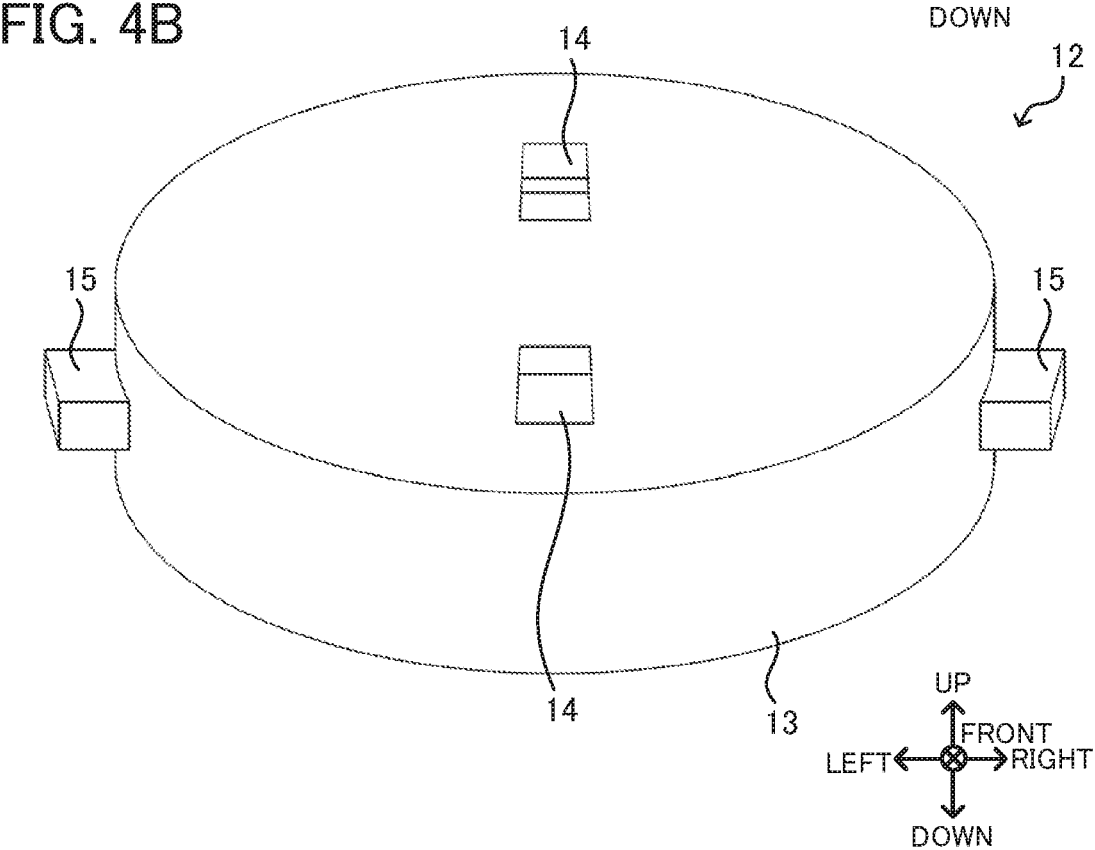
FIG. 4B is a perspective view of the adapter according to the embodiment of the present disclosure as viewed from above.

As shown in FIGS. 4A and 4B, the adapter 12 includes a housing 13, upper locking tabs 14 for connecting the adapter 12 to the lighting wiring base 10 mounted on a ceiling surface C of a room, the device locking tabs 15 for connecting the adapter 12 to the ceiling-mounted device 20 to fix the ceiling-mounted device 20, the levers 16 and 17, and a power supply connector (not shown).

The housing 13 is substantially cylindrical and formed from a non-conductive resin. The upper locking tabs 14 protrude from the upper surface of the housing 13, and the device locking tabs 15 protrude in the lateral direction from the side surface. The adapter 12 including the device locking tabs 15 protruding from the housing 13 supports the ceiling-mounted device 20.

The levers 16 and 17 are arranged on the lower surface of the housing 13. A user moves the levers 16 and 17 in the lateral direction toward each other with the digits to retract the device locking tabs 15, protruding from the housing 13, into the housing 13. The user can thus remove the ceiling-mounted device 20 from the adapter 12.

Method for Removing Ceiling-Mounted Device 20

As shown in FIG. 1, the user fits the side wall 31 of the engagement portion 30 of the ceiling-mounted device support 1 into the attachment portion 22 of the ceiling-mounted device 20 mounted on the lighting wiring base 10 on the ceiling surface C of the room with the adapter 12. In this process, the side wall 31 is rotated to adjust the support portion 40 to extend in the front-rear direction in a bottom view as shown in FIG. 3 to prevent the support portion 40 from interfering with the operating range of the levers 16 and 17 in a bottom view. The power supply connector of the ceiling-mounted device 20 is to be disconnected from the power supply connector of the adapter 12 before the ceiling-mounted device support 1 is fitted into the ceiling-mounted device 20.

As shown in FIG. 1, the user, supporting the portion of the ceiling-mounted device 20 other than the attachment portion 22 with the one hand H1, places the another hand H2 through the lower end of the side wall 31 of the ceiling-mounted device support 1. While tightly gripping the support portion 40 with the another hand H2 or supporting the support portion 40 from below with the palm of the another hand H2, the user places the another hand H2 through the upper end of the side wall 31 and operates the levers 16 and 17 on the lower portion of the adapter 12 toward each other with the digits of the another hand H2 to remove the ceiling-mounted device 20 from the adapter 12. After removing the ceiling-mounted device 20 from the adapter 12, the user tightly grips the support portion 40 with the other hand H2 and moves the ceiling-mounted device 20 onto, for example, a floor or a table.

As described above, the ceiling-mounted device support 1 according to the present embodiment is fitted into the attachment portion 22 of the ceiling-mounted device 20 mounted on the lighting wiring base 10 with the adapter 12. While tightly gripping the support portion 40 with the other hand H2 or supporting the support portion 40 from below with the palm of the another hand H2, the user can operate the levers 16 and 17 with the digits of the another hand H2 to remove the ceiling-mounted device 20 from the adapter 12. The attachment portion 22 is arranged in substantially the center of the ceiling-mounted device 20 in a bottom view. Thus, after removing the ceiling-mounted device 20 from the adapter 12, the user can stably support substantially the center of the ceiling-mounted device 20 with the support portion 40. Thus, the user can remove the ceiling-mounted device 20 from the adapter 12 while supporting the ceiling-mounted device 20 with both hands. The ceiling-mounted device support 1 used for the ceiling-mounted device 20 thus allows easy and safe removal of the ceiling-mounted device 20 with any weight from the adapter 12.

The present invention may be variously modified without departing from the spirit and scope of the present invention in a broad sense. The above embodiment is described as one example of the present invention and should not be construed as limiting the scope of the present invention. The embodiment and any modification may be combined as appropriate. Additionally, some components may be excluded as appropriate within the technical idea of the present invention.

In the above embodiment, for example, the ceiling-mounted device support 1 is used for the ceiling-mounted device 20 that is a typical ceiling light. However, the ceiling-mounted device support 1 may be used for any ceiling-mounted device mountable on a lighting wiring base with an adapter, such as a ceiling light incorporating a speaker, a ceiling light incorporating a projector, or a speaker or a projector fixed to a ceiling. The ceiling-mounted device support 1 may be formed from, for example, a resin, instead of an elastic material. The profile of the ceiling-mounted device in a bottom view may be, for example, substantially rectangular or substantially elliptic, instead of substantially circular. The ceiling-mounted device may include a light source of any type.

In the above embodiment, the attachment portion 22 is arranged in substantially the center of the ceiling-mounted device 20 in a bottom view. However, the attachment portion may be arranged off the center of the ceiling-mounted device in a bottom view. For example, in a room accommodating a wardrobe, a light decentered in the room may reduce the illumination difference of the light across the room. In that case, the attachment portion may be arranged off the center of the ceiling-mounted device in a bottom view.

Figure 5A:
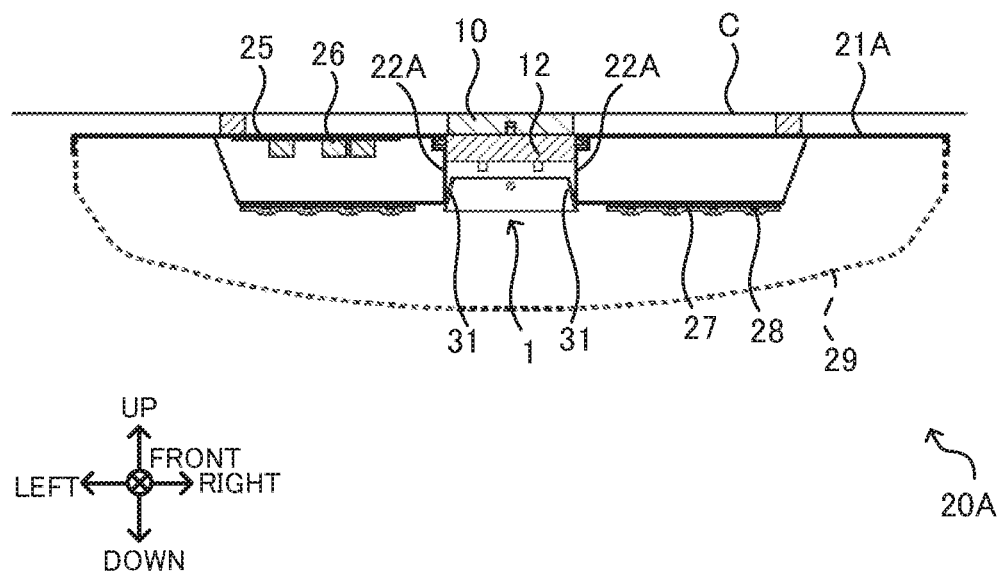
FIG. 5A is a cross-sectional side view of the ceiling-mounted device support according to the embodiment of the present disclosure used for a ceiling-mounted device according to another embodiment.

Although the side wall 31 is fitted into the attachment portion 22 in the above embodiment, the side wall 31 may be engaged with an attachment portion 22A as shown in FIG. 5A. The attachment portion 22A is substantially cylindrical and has open upper and lower ends. The side wall 31 has an upper diameter smaller than the diameter of the attachment portion 22A, and a lower diameter greater than the diameter of the attachment portion 22A. The side wall 31 is engaged with the attachment portion 22A with the support portion 40 supported with the palm of the other hand H2 of the user. The side wall 31 is simply engaged with the attachment portion 22A and is more easily positioned to prevent the support portion 40 from interfering with the operating range of the levers 16 and 17 than the side wall 31 fitted into the attachment portion 22.

Figure 5B:
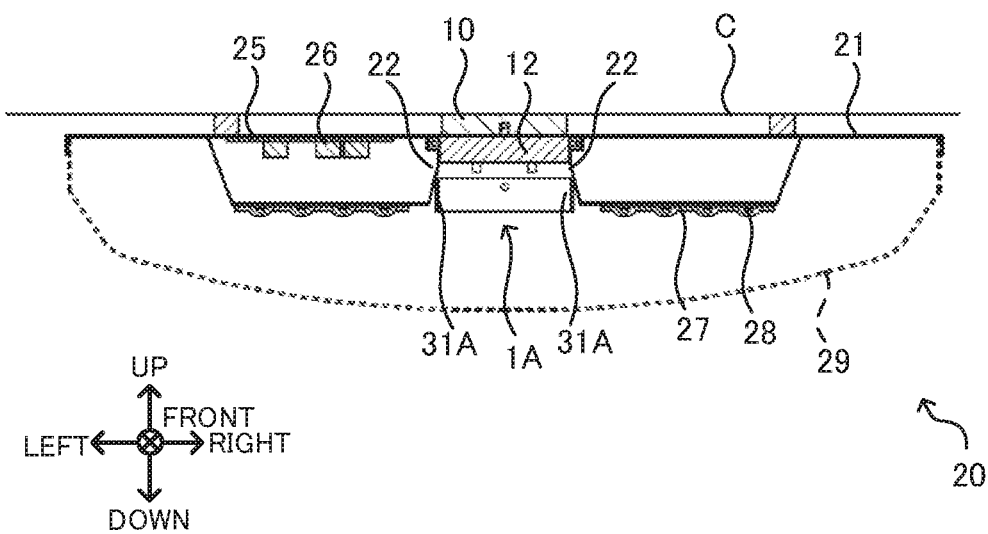
FIG. 5B is a cross-sectional view of a ceiling-mounted device support according to another embodiment used for the ceiling-mounted device according to the embodiment of the present disclosure.

As shown in FIG. 5B, only the attachment portion 22 is substantially trapezoidal in a side view, and a side wall 31A is substantially cylindrical. The side wall 31A may be engaged with the attachment portion 22. In some embodiments, the side wall and the attachment portion may both be substantially cylindrical or may be in other shapes.

Although the support portion 40 is integral with the side wall 31 in the above embodiment, the support portion may be a separate component removable from the side wall 31. In some embodiments, the support portion may be a single component directly attachable in, for example, a hole in an attachment portion of a ceiling-mounted device (by, for example, extending or retracting the ends of the support portion or by bending the support portion) instead of being attached to the side wall.

Although the side wall 31 and the attachment portion 22 have a substantially circular cross section in a plan view in the above embodiment, either the side wall 31 or the attachment portion 22 may have a substantially circular cross section, and the other may be a polygonal or substantially elliptic in a plan view. In some embodiments, the side wall and the attachment portion may both be polygonal or substantially elliptic in a plan view. The side wall and the attachment portion may have other shapes in either a side view or a plan view that allow the side wall to be fitted into or engaged with the attachment portion.

Figure 6:
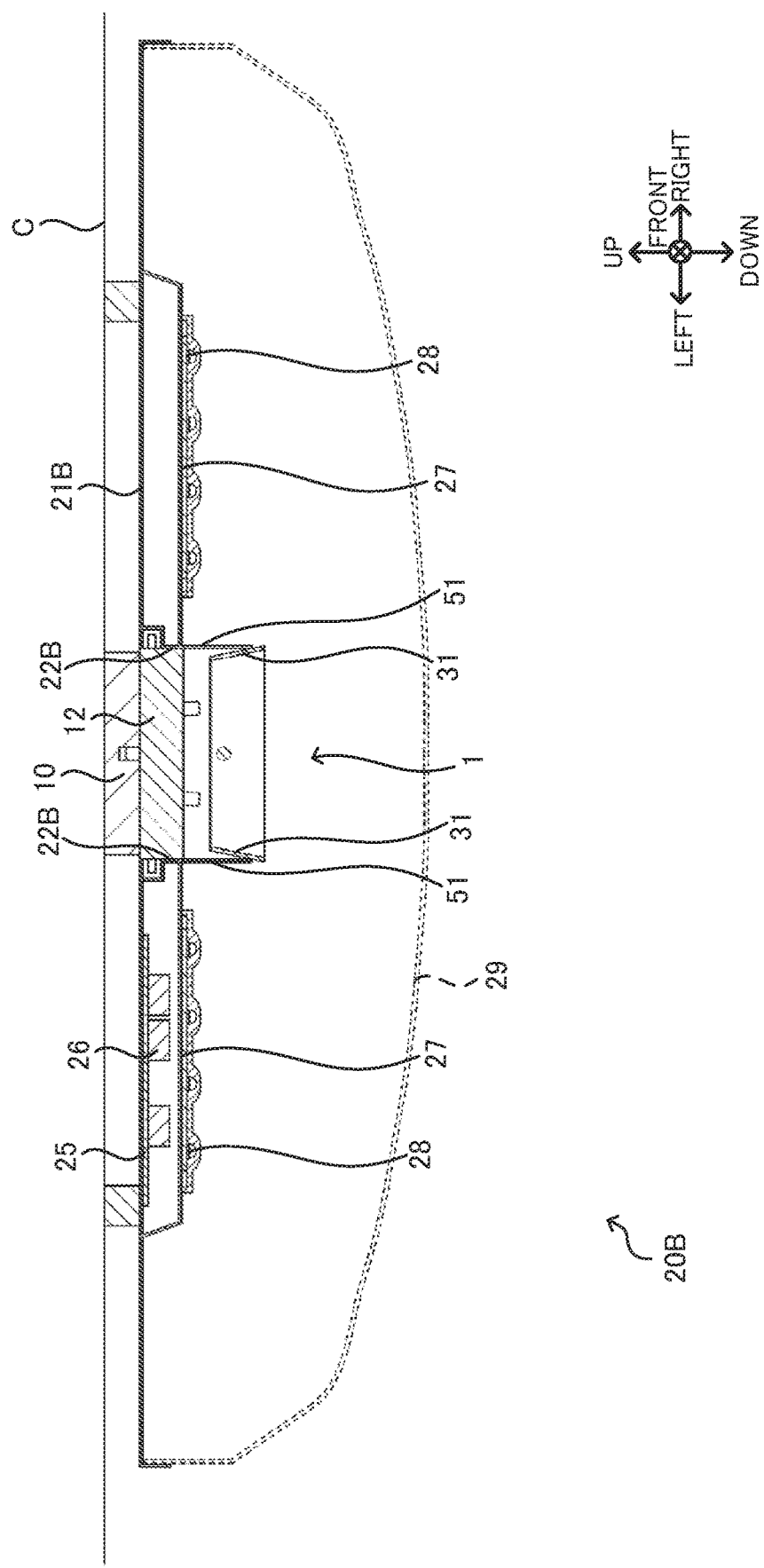
FIG. 6 is a cross-sectional side view of the ceiling-mounted device support according to the embodiment of the present disclosure used for a ceiling-mounted device according to another embodiment.
Figure 7:
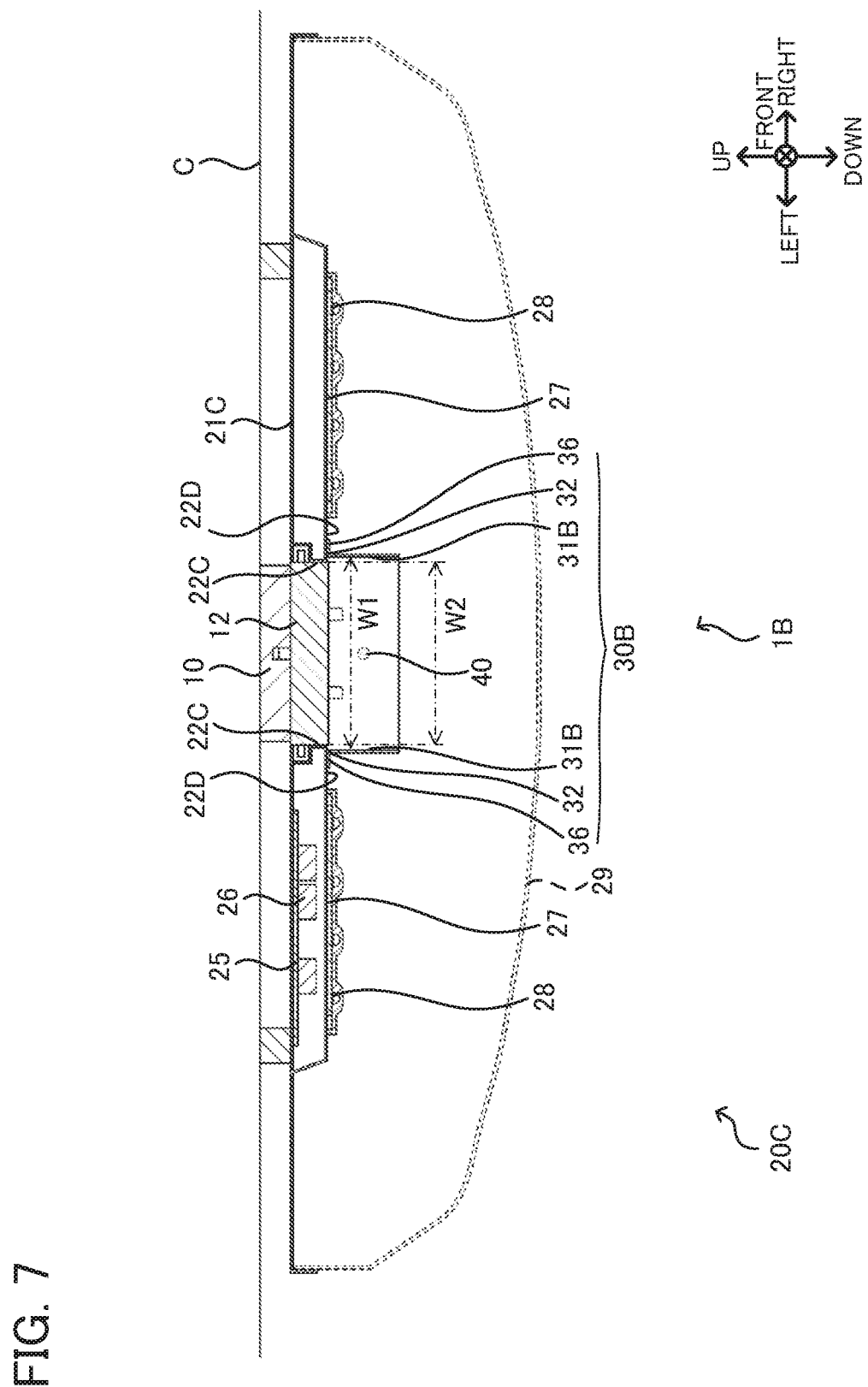
FIG. 7 is a cross-sectional side view of a ceiling-mounted device and a ceiling-mounted device support according to another embodiment.

Although the attachment portion 22 is a wall surface of the upper housing 21 in the above embodiment, an attachment portion 22B of a thin upper housing 21B extending downward may have a wall surface 51 protruding to define a space for receiving the ceiling-mounted device support 1 as shown in FIG. 6. In some embodiments, as shown in FIG. 7, an attachment portion 220 neither protruding downward from an upper housing 21C nor receiving an engagement portion 30B may receive a press-fixed portion 36 extending from an upper end 32 of a side wall 31B of the engagement portion 30B toward the outer rim (in the radial direction) of a ceiling-mounted device 20C. The press-fixed portion 36 may be engaged with an attachment portion 22D extending from the lower end of the attachment portion 22C to the upper housing 21C on the inner side of the ceiling-mounted device 20C. In this structure, an opening width W1 of the upper end 32 of the side wall 31B may be greater than an opening width W2 of the attachment portion 22C of the ceiling-mounted device 20C, and the press-fixed portion 36 may have an upper surface formed from a material having a high friction coefficient such as rubber to firmly press and fix a ceiling-mounted device support 1B to the ceiling-mounted device 20C.

Although the lighting wiring base 10 is a substantially cylindrical ceiling rose body in the above embodiment, the lighting wiring base may be substantially rectangular parallelepiped or may be an embedded ceiling rosette or a high-load ceiling rosette (JIS C 8310:2000). In some embodiments, the lighting wiring base 10 may be a lighting wiring base with a predetermined (or a de facto standard) shape specified by each country or region, and the adapter may have a shape corresponding to the lighting wiring base.

Although the levers 16 and 17 on the adapter 12 are moved toward each other with the digits of a user to retract the device locking tabs 15 protruding from the housing 13 into the housing 13 in the above embodiment, the levers may be moved away from each other with the digits of a user, or the levers may be rotatable to retract the device locking tabs into the housing. The structure may include any adapter that allows the support portion to be positioned without interfering with the operation of the levers for retracting the device locking tabs into the housing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 1A, 1B Ceiling-mounted device support
10 Lighting wiring base
12 Adapter
13 Housing
14 Upper locking tab
15 Device locking tab
16, 17 Lever
20, 20A, 20B, 20C Ceiling-mounted device
21, 21A, 21B, 21C Upper housing
22, 22A, 22B, 22C, 22D Attachment portion
23 Locking slot
24 Power circuit
25 Power supply board
26 Electronic component
27 Light source board
28 LED
29 Cover
30, 30B Engagement portion
31, 31A, 31B Side wall
32 Upper end
33 Lower end
36 Press-fixed portion
40 Support portion
51 Wall surface
C Ceiling surface
H1 One hand
H2 Another hand
S Space

What is claimed is:

1. A ceiling-mounted device support, comprising:
   an engagement portion to be engaged with an attachment portion of a ceiling-mounted device mounted on a ceiling surface of a room with an adapter, the engagement portion including a side wall having an open upper end, an open lower end, and an internal space; and
   a support portion having two ends connected to the side wall and extending through the space, wherein
   the engagement portion is to be engaged with the attachment portion, and
   the support portion is supportable with a palm and grippable with digits of a hand.

2. The ceiling-mounted device support according to claim 1, wherein
   the side wall is wider at the lower end than at the upper end in a side view.

3. The ceiling-mounted device support according to claim 1, wherein
   the side wall is fitted to the attachment portion.

4. The ceiling-mounted device support according to claim 1, wherein
   the attachment portion and the side wall have a substantially circular cross section in a plan view.

5. The ceiling-mounted device support according to claim 1, wherein
   the engagement portion further includes a press-fixed portion at the upper end, and
   the press-fixed portion is press-fixed and engaged with the attachment portion.

6. The ceiling-mounted device support according to claim 1, wherein
   the support portion is removable.

7. A ceiling-mounted device mountable on a ceiling surface of a room with an adapter, the device comprising:
   an attachment portion to accommodate at least part of the adapter or to be located around a lower portion of the adapter,
   wherein the attachment portion is to receive a ceiling-mounted device support including an engagement portion to be engaged with the attachment portion and a support portion, the engagement portion includes a side wall having an open upper end, an open lower end, and an internal space, and the support portion has two ends connected to the side wall and extends through the space, and
   the support portion is supportable with a palm and grippable with digits of a hand.

8. The ceiling-mounted device according to claim 7, wherein
   the attachment portion is arranged in substantially a center in a plan view.

9. The ceiling-mounted device according to claim 7, wherein
   the attachment portion includes a wall surface protruding downward.

10. A method for removing a ceiling-mounted device, comprising:
    engaging an engagement portion of a ceiling-mounted device support with an attachment portion of a ceiling-mounted device mounted on a ceiling surface of a room with an adapter, the ceiling-mounted device support including a side wall having an open upper end, an open lower end, and an internal space, and removing the ceiling-mounted device from the adapter, performed by a user, while supporting a portion of the ceiling-mounted device other than the attachment portion with one hand, placing another hand through the lower end, and placing digits of the another hand through the upper end while supporting, with the another hand, a support portion having two ends connected to the side wall and extending through the space.

11. The ceiling-mounted device support according to claim 2, wherein the side wall is fitted to the attachment portion.

12. The ceiling-mounted device support according to claim 2, wherein the attachment portion and the side wall have a substantially circular cross section in a plan view.

13. The ceiling-mounted device support according to any one of claim 3, wherein the attachment portion and the side wall have a substantially circular cross section in a plan view.

14. The ceiling-mounted device support according to claim 2, wherein the engagement portion further includes a press-fixed portion at the upper end, and the press-fixed portion is press-fixed and engaged with the attachment portion.

15. The ceiling-mounted device support according to claim 11, wherein the engagement portion further includes a press-fixed portion at the upper end, and the press-fixed portion is press-fixed and engaged with the attachment portion.

16. The ceiling-mounted device support according to claim 13, wherein the engagement portion further includes a press-fixed portion at the upper end, and the press-fixed portion is press-fixed and engaged with the attachment portion.

17. The ceiling-mounted device support according to claim 2, wherein the support portion is removable.

18. The ceiling-mounted device support according to claim 11, wherein the support portion is removable.

19. The ceiling-mounted device support according to claim 13, wherein the support portion is removable.

20. The ceiling-mounted device according to claim 8, wherein the attachment portion includes a wall surface protruding downward.

* * * * *